United States Patent
White et al.

(10) Patent No.: US 9,661,084 B2
(45) Date of Patent: *May 23, 2017

(54) METHOD AND SYSTEM FOR SAMPLING ONLINE COMMUNICATION NETWORKS

(71) Applicant: 7517700 Canada Inc. O/A Girih, Kanata (CA)

(72) Inventors: John Kenton White, Ottawa (CA); Guichong Li, Ottawa (CA)

(73) Assignee: 7517700 Canada Inc. O/A Girih, Ottawa (CA)

(*) Notice: Subject to any disclaimer, the term of this patent is extended or adjusted under 35 U.S.C. 154(b) by 654 days.

This patent is subject to a terminal disclaimer.

(21) Appl. No.: 14/039,086

(22) Filed: Sep. 27, 2013

(65) Prior Publication Data

US 2014/0095616 A1  Apr. 3, 2014

Related U.S. Application Data

(60) Provisional application No. 61/707,511, filed on Sep. 28, 2012.

(51) Int. Cl.
*G06F 17/30* (2006.01)
*H04L 29/08* (2006.01)
*G06Q 50/02* (2012.01)

(52) U.S. Cl.
CPC ............ *H04L 67/16* (2013.01); *G06Q 50/02* (2013.01); *H04L 67/22* (2013.01)

(58) Field of Classification Search
CPC ........ G06F 17/30864; G06F 17/30536; G06Q 50/01; G06Q 50/02; H04L 67/16; H04L 67/22

USPC .......................................................... 707/709
See application file for complete search history.

(56) References Cited

U.S. PATENT DOCUMENTS

| | | | | |
|---|---|---|---|---|
| 8,311,950 | B1* | 11/2012 | Kunal | G06Q 30/0201 705/319 |
| 8,923,152 | B2* | 12/2014 | Benko | H04L 43/022 370/252 |
| 2005/0171799 | A1* | 8/2005 | Hull | G06Q 10/107 705/319 |
| 2007/0011683 | A1* | 1/2007 | Helander | G06F 9/4887 718/104 |
| 2007/0226248 | A1* | 9/2007 | Darr | G06Q 10/10 |
| 2009/0106822 | A1* | 4/2009 | Obasanjo | G06Q 10/107 726/4 |
| 2010/0063973 | A1* | 3/2010 | Cao | G06F 17/30477 707/758 |

(Continued)

OTHER PUBLICATIONS

Minas Gjoka et al. "A Walk in Facebook: Uniform Sampling of Users in Online Social Networks", arXiv.org, version 5 Jun. 17, 2011.

(Continued)

*Primary Examiner* — Thanh-Ha Dang
(74) *Attorney, Agent, or Firm* — Middleton Reutlinger; John F. Salazar

(57) ABSTRACT

A representative sample of an online social network is formed by performing a deterministic process that coalesces to indicate success. A random value is selected for seeding the process. Based on the random value, the process is executed and once the process coalesces, a proper sampling of the online social network results.

23 Claims, 3 Drawing Sheets

(56) References Cited

U.S. PATENT DOCUMENTS

| | | | | |
|---|---|---|---|---|
| 2010/0076913 A1* | 3/2010 | Yang | ............ | G06N 7/005 |
| | | | | 706/13 |
| 2011/0078306 A1* | 3/2011 | Krishnamurthy | ...... | G06Q 10/10 |
| | | | | 709/224 |
| 2011/0295626 A1* | 12/2011 | Chen | ............ | G06Q 30/02 |
| | | | | 705/7.11 |
| 2012/0078918 A1* | 3/2012 | Somasundaran | ..... | G06F 17/278 |
| | | | | 707/748 |
| 2012/0174006 A1* | 7/2012 | Brownell | ............ | G06Q 50/01 |
| | | | | 715/764 |
| 2012/0259915 A1* | 10/2012 | Bhatt | ............ | G06Q 50/01 |
| | | | | 709/204 |
| 2012/0275331 A1* | 11/2012 | Benko | ............ | H04L 43/026 |
| | | | | 370/252 |
| 2013/0036112 A1* | 2/2013 | Poon | ............ | G06Q 50/01 |
| | | | | 707/723 |
| 2013/0218965 A1* | 8/2013 | Abrol | ............ | H04L 67/22 |
| | | | | 709/204 |
| 2015/0049634 A1* | 2/2015 | Levchuk | ............ | H04L 41/14 |
| | | | | 370/254 |
| 2015/0234928 A1* | 8/2015 | Krishnamurthy | . | G06F 17/30867 |
| | | | | 707/709 |
| 2015/0347591 A1* | 12/2015 | Bax | ............ | G06Q 50/01 |
| | | | | 707/749 |

OTHER PUBLICATIONS

United States Patent and Trademark Office, Office Action for U.S. Appl. No. 14/039,352, 23 pages dated Oct. 3, 2016.

* cited by examiner

METHOD AND SYSTEM FOR SAMPLING ONLINE COMMUNICATION NETWORKS

FIELD OF THE INVENTION

The invention relates generally to the field of social networking and more particularly to generating representative sampling from a social network dataset.

BACKGROUND

Analyzing or mining online social networks (OSN) has become one of the most pressing problems of modern-day data mining. The need arises due to the exponential growth of these networks as they become increasingly popular. Networks such as Facebook®, Twitter®, and LinkedIn® include vast amounts of information and vast amounts of interconnection information that is useful for many purposes. Some non-limiting examples of purposes include commercial purposes, management purposes, political purposes, research purposes, demographic purposes, emergency preparedness applications, and defense and security applications.

Tracing through social graphs is desirable as is identifying social trends, that said, a brute force approach is problematic due to the sheer volume and ever changing nature of the data set. For example, the Facebook® network takes up hundreds of terabytes of memory storage relating to hundreds of millions of people. The volume of information is expanding on a daily basis as more and more people join the service or post information. Processing the information remains a daunting task. Apparently effective methods for processing the data include specific record analysis where a single record is selected and analysed, for example to determine a suitable advertisement for a particular user; crawling, where data is crawled off line and the results of crawling are useful in indexing or searching the large dataset, responsively; and sampling, where a small sample is selected from the huge data set for use in responsive analysis. In order for sampling to work correctly, sample data is preferably representative of the whole data set or, alternatively the results of the analysis and sampling are together representative of the dataset. Recent research has shown that sampling is achievable by crawling online social networks to find a relatively small representative sample suitable, for example, for studying properties and testing algorithms. The sample is extracted through the crawling and then used for more responsive data analysis.

A number of existing techniques for crawling include the breadth-first search (BFS) and random walks (RW). It is known that these techniques usually yield a bias toward the most highly connected nodes. With social networks, this is highly problematic as some nodes have such high connectivity—imagine someone famous—that they skew resulting samples. That said, crawling using the traditional Metropolis-Hasting algorithm (MH), which is a typical Monte Carlo Markov Chain (MCMC) technique, can create unbiased samples suitable for the problem of social network analysis and social network activity analysis.

The breadth-first search (BFS) method, which is regarded as a graph traversal technique, explores the next node assuming the traditional breadth-first search algorithm. It has been used practically for sampling online social networks in past research. Recent research also shows that the methodology sometimes densely covers a specific region of a graph due to incomplete search, but this bias is potentially correctable by deriving an unbiased estimator of the original node degree distribution. That said, even such an estimator may be difficult to derive.

The random walk (RW) method chooses a next state W uniformly and at random among the neighbors of a current node V. Because the probability of the RW at the particular node V converges, the random walk sample nodes are biased towards high degree nodes. This bias may be corrected by an appropriate re-weighting of the measured value such as the Hansen-Hurwitz estimator. That said, the biasing is problematic in most social networks as some nodes are extremely high degree relative to others.

The Metropolis-Hasting Random Walk (MHRW) method appropriately modifies transition probabilities so that over sufficient time it converges to a uniform distribution. The Metropolis-Hasting process is a typical Markov Chain Monte Carlo (MCMC) technique for sampling from a probability distribution.

Techniques for crawling using random walks based on traditional Markov Chain Monte Carlo (MCMC) methods are known. Typically, the chain is started from an initial state, and it is run for some burn-in time assumed long enough for the chain to have converged. Generated samples are assumed to be truly samples from a stationary distribution. Although various diagnostics such as Geweke Diagnostic and Gelman-Rubin Diagnostic can be used for assessing convergence, none of them guarantees that the chain has exactly converged. As a result, the samples are usually only approximate. It has been shown that the MHRW requires a large number of rejections during the initial sampling process, and the method is subject to slow mixing.

However, MCMC techniques such as the Metropolis-Hasting process come with significant challenges: significant burn-in lengths and correlation with initial node choice are just two significant drawbacks. This usually leads to slow mixing. For example, recent research has shown that the Metropolis-Hasting Random Walk (MHRW) process usually produces unbiased samples of Facebook® by randomly requesting 84 k samples for convergence after discarding a burn-in length of 6 k. On the other hand, various convergence diagnostic methods such as Geweke Diagnostic cannot guarantee the chain has converged to a sample value from the desired distribution. Therefore, the sample, e.g., 78 k, obtained by such MCMC algorithm is usually approximate. Verification of the sample is a time consuming task because the data set, which is very large, must be analysed to determine the representative nature of the sample.

It would be advantageous to provide a more deterministic approach to sample generation.

SUMMARY OF THE INVENTION

In accordance with the invention there is provided a method of providing an online social network, the online social network comprising at least a data store for storing data relating to a plurality of connections forming a state space and a communication port for supporting communication with individuals to whom the connections relate, the individuals communicating with the online social network via a wide area communication network; providing a first seed value; providing a coupling-from-the-past process having an update function for resulting in a non-trivial state space smaller than the state space of the online social network and forming a representative sample thereof; based on the first seed value selecting at least a first node; retrieving from the online social network dataset via the wide area communication network data based on the selected at least a first node; and applying the coupling-from-the-past process having the update function to the at least a first node to determine a non-trivial state space based on the first seed value, the non-trivial state space smaller than the state space of the online social network and the non-trivial state space forming an intermediate state in determining a representative sample of the online social network, and using the non-trivial state space to form a first representative sample.

In accordance with the invention there is provided a method of sampling an online social network dataset comprising: providing a first seed value; providing a coupling-from-the-past process having an update function for resulting in a non-trivial state space smaller than the state space of the online social network and forming a representative sample thereof; based on the first seed value selecting at least a first node; retrieving from the online social network dataset via a computer communication network data based on the selected at least a first node; and applying the coupling-from-the-past function having the update function to the at least a first node to determine a first non-trivial state space based on the first seed value, the first non-trivial state space smaller than the state space of the online social network and the non-trivial state space forming an intermediate state in determining a representative sample of the online social network.

In accordance with the invention there is provided a method comprising of deterministically determining a representative sample of a large online graph by selecting at least a first node and iterating until a process coalesces on the representative sample.

In accordance with the invention there is provided a method sampling an online social network dataset comprising: providing a statistical description of a representative sample of a state space; determining based on the statistical description a minimum number of nodes within a representative sample meeting the statistical description; performing at least two separate processes on a same online social network dataset to determine at least two representative samples each having at least the minimum number of nodes therein for being combined into a single larger representative sample.

In accordance with the invention there is provided a method of sampling an online social network dataset comprising: providing a statistical description of a representative sample of a state space; determining based on the statistical description a first number of nodes within a representative sample meeting the statistical description; at intervals automatically extracting a representative sample having the first number of nodes therein from an online social network dataset.

BRIEF DESCRIPTION OF THE DRAWINGS

The invention will now be described with reference to the attached drawings in which.

DETAILED DESCRIPTION OF EMBODIMENTS OF THE INVENTION

In coupling-from-the-past (CFTP), convergence is achieved by coalescence to a single state. Theoretically, the single state is a perfect sample from a stationary distribution. Therefore, issues of selecting proper convergence diagnostics are obviated. There are at least two problems to overcome in applying coupling-from-the-past to Metropolis-Hasting problems. Firstly, an update function in coupling-from-the-past processes is a random map that defines how a state moves to a new state. Defining an effective update function is not trivial and an improper update function sometimes result in a failure to coalesce to a single state—a failure of the process. Secondly, the state space is usually unavailable for coupling-from-the-past processes. At inception, one has only a few initial nodes for crawling. Even if the whole state space of an online social network is available, it is usually too large to be used with coupling-from-the-past processes. Thus, application of coupling-from-the-past processes to online social networks is both non-trivial and has no apparent solution.

Figure 3:
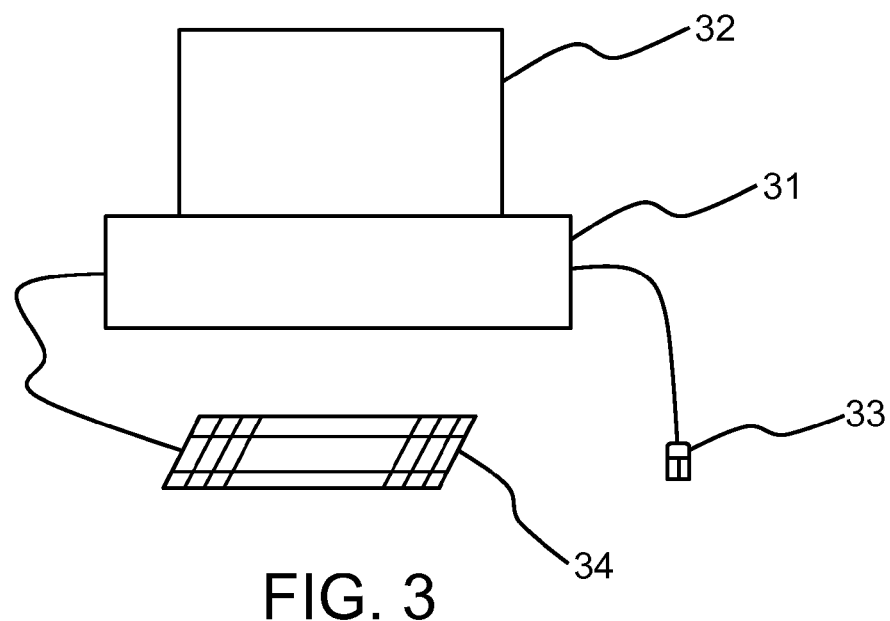
FIG. 3 is a simplified block diagram of a first user system.

Referring to FIG. 3, shown is a computer system for use with the present invention. A computer 31 is coupled to a display 32, a mouse 33 and a keyboard 34. Alternatively, the entire computer system is integrated, for example within a laptop, tablet or smart phone.

Figure 4:
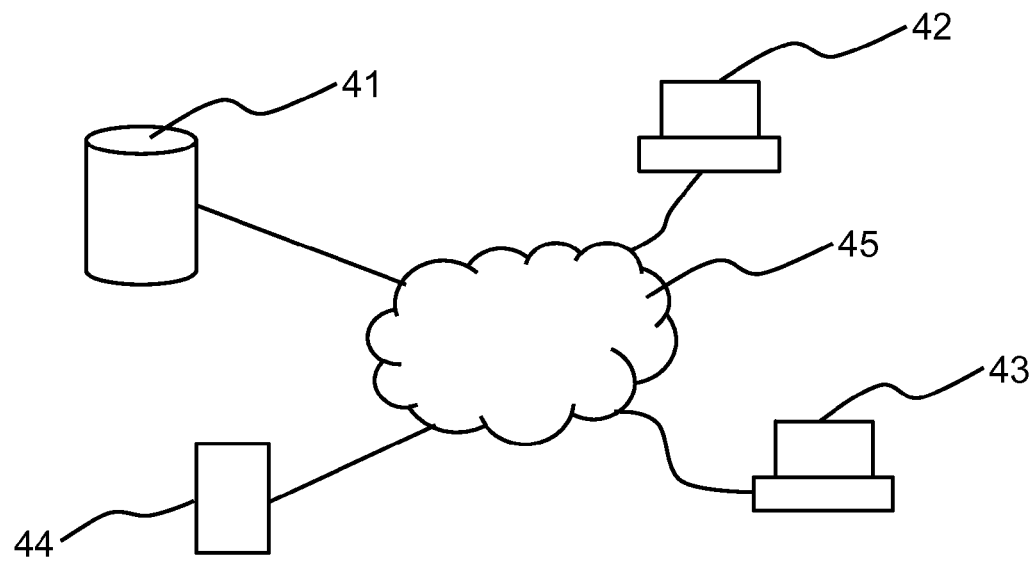
FIG. 4 is a simplified block diagram of a network including a social network.

Referring to FIG. 4, shown is a simplified network diagram showing a network 45 in the form of the Internet. A computer 42 similar to that of FIG. 3 is shown coupled to the Internet. Also coupled to the Internet are server 44, computer 43 and online social network server and data storage 41.

Figure 5:
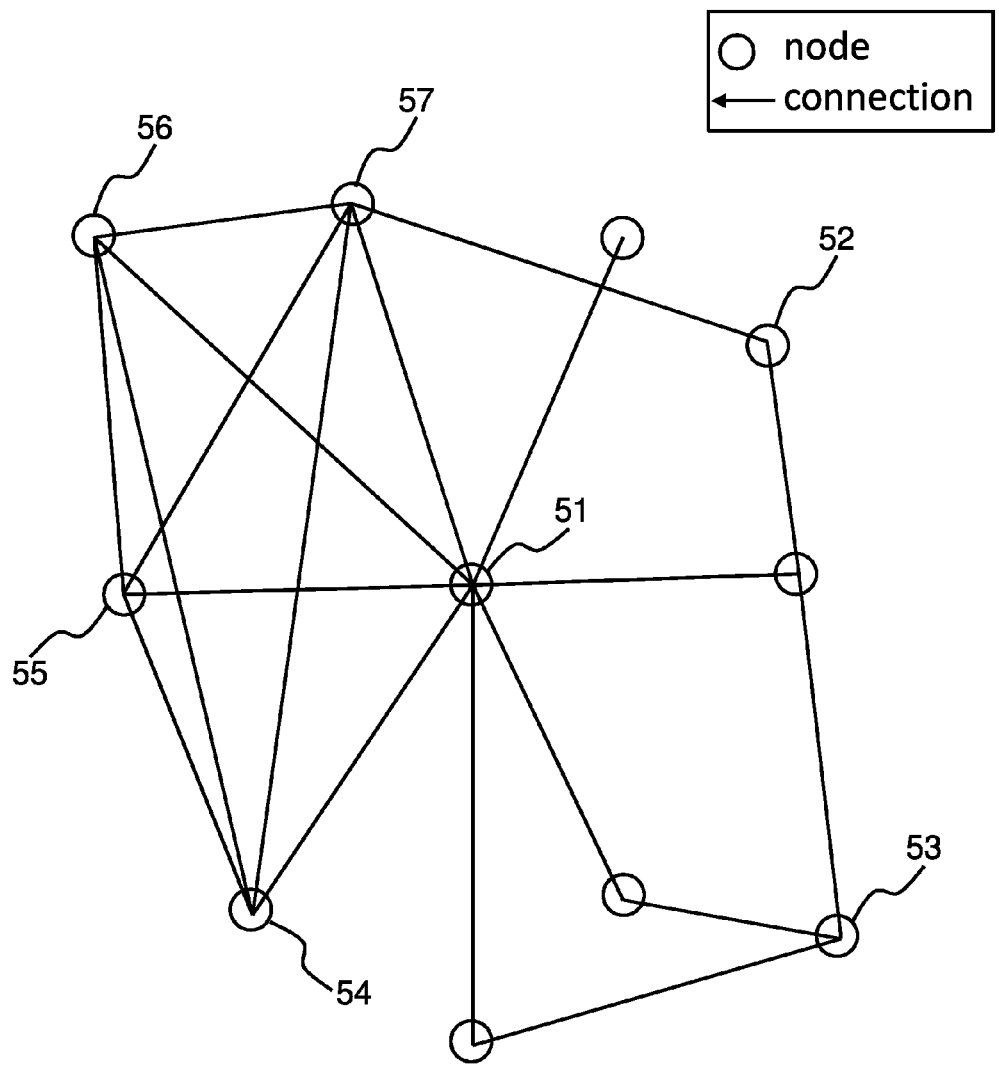
FIG. 5 is a simplified diagram of a plurality of nodes in a social network.

Referring to FIG. 5, shown is a simplified diagram of a representative social graph for a social network. Here, node 51 is connected to nearly every other node. Nodes 52 and 53 are not connected to node 51. This node 51 has a high order of connectivity. If the nodes are traversed at random, it can easily be seen that node 51 would be traversed more than node 52. Nodes 54, 55, 56, and 57 form a tight knit social group. As opposed to other groups of nodes shown with looser social coupling. Clearly, it is difficult to determine a statistically relevant representative sample, even of this very small graph. The Facebook® social network graph comprises hundreds of millions of nodes.

It has now been found that some of the issues with the Metropolis-Hasting process are obviated using a coupling-from-the-past (CFTP) process with a selected update function. Results are superior to other MCMC techniques such as the MHRW for sampling on large, complex and ever changing networks, and the resulting sample is more suitable for social network analysis than other MCMC techniques.

In theory, a coupling-from-the-past process allows for perfect sampling from a given distribution. In practice, a quality of sampling is dependent upon many factors. That said, once the parameters and quality of sampling are determined based on the update function and the process itself, representative samples are automatically generatable by the process repeatedly and at different times. Thus, the update function once defined allows for automated sample generation from the ever-changing data sets that make up social networks. Advantageously, such a system allows for generation of a sample when needed that is representative of a much larger data set and that can be analysed further and with less difficulty than the larger data set.

According to the coupling-from-the-past process, burn-in time is determined by ascertaining coalescence to a single value. Therefore, the coupling-from-the-past process is deterministic—reaches a representative sample—and determining sufficient convergence is obviated. The fundamentals of the coupling-from-the-past process are described as follows:

Let P be a transition probability defining an ergodic Markov chain on state space $\Omega$. The transition probability is associated with a random function representation, $$Pr(\Phi(x)=y)=P(x,y) \qquad (3)$$

Where $x, y \in \Omega$. That is, the probability of mapping x to y is equal to the transition probability $P(x, y)$ in the Markov chain.

Assuming that $t_1$ and $t_2$ are two time steps of Markov chains. The composite map $F_{t1}^{t2}$, which describes evolution of Markov chains from $t_1$ to $t_2$ given any initial state x, is defined as $$F_{t1}^{t2}(x) = (\Phi_{t_2-1} \cdot \Phi_{t_2-2} \cdot \ldots \cdot \Phi_{t_1})(X) \qquad (4)$$
$$= (\Phi_{t_2-1}(\Phi_{t_2-2}(\ldots \Phi_{t_1}(x)\ldots))), \forall x \in \Omega.$$

Therefore, $F_0^t$ and $F_{-t}^0$, where t approaches infinity, define forward coupling and the backward coupling Markov chains, respectively. It has been observed that the forward coupling Markov chains do not necessarily produce a sample from a stationary distribution and are subject to a bias due to changed coalescence time. In contrast backward coupling produces a "perfect" sample within limits without any bias due to a fixed time for coalescence detection. Coupling-from-the-past is a backward coupling technique for 'perfect' sampling. It assumes that an ergodic Markov chain with discrete and finite state space of size N exists. Coupling-from-the-past forms or processes N copies of a chain from the past, where each copy corresponds to a different initial state. The chains eventually coalesce to a steady state by time t=0. Therefore, the effect of initial states in the Markov chains is ruled out once coalescence occurs. This steady state is a reliable sample from the stationary distribution and approximates a perfect sample.

For simulation of coupling from an infinite past, a coupling-from-the-past process executes N chains starting at T=−1; the N chains are checked for coalescence at t=0. If coalescence occurs, the single state of the chains at t=0 is accepted as an effective sample from the stationary distribution. Otherwise, the starting time is moved back to T=−2 T, and the process is repeated, until coalescence occurs at t=0. Of course, the process is also executable with different step size, for example t=−5 then t=−10, and so forth.

An overview of the coupling-from-the-past process is set out below:

Input M: initial time (>0), $\Omega$: state space
Output $X^0$: singleton state

```
begin
    T = M, T_0 = 0
    repeat
        R^{-T+1}, R^{-T+2}, ..., R^{To} ~U(0,1)
        X^{-T} = Ω, t=-T
        while t < 0
            X^{t+1} = Φ(X^t, R^{t+1})
            t = t + 1
        T_0 = -T, T = 2T
    until |X^0| = 1
end
```

There are several significant issues for success of coupling-from-the-past processes for sampling online social networks reliably in practical applications. The first is how to define the update function $\Phi_t$ for evolution of Markov chains when only a local transition probability P is available. The update function is also termed a random map, which is just a random function representation of P as described above. An invalid $\Phi_t$ sometimes leads to failure of coalescence in coupling-from-the-past process. Secondly, those $\Phi_t$, $t=-\infty, \ldots, 0$, should be independent and identically distributed and generated for building the composite map $F_t^0$. This is achieved, for example, by defining a random vector $R^t$, $t=-T, -T+1, \ldots, -1, 0$, generated uniformly at random from U(0, 1). Moreover, random numbers $R^t$ generated in previous iterations are re-used. Thirdly, instead of the whole state space $\Omega$, it is often desirable to identify a small state space $\Omega'$, which is not trivial when sampling from large online social networks.

Two issues for defining the update function and identifying a subset of the whole state space $\Omega$ are discussed hereinbelow.

The update function is defined as follows:

$$X^{t+1}=\Phi(X^t, R^{t+1}) \qquad (5)$$

where $R^{t+1} \sim U(0, 1)$ and $X^t, X^{t+1} \subseteq \Omega$; this defines a random map as $\Phi_t(\chi):\Omega$ approaches $\Omega$, $\chi \in \Omega$.

In more detail, the update function maps a set of nodes $X^t$ to a new set of nodes $X^{t+1}$. Each node in $X^t$ is mapped to a new adjacent node based on a probability of transition. For a graph, the probability of transition is typically a global property. Which adjacent node to select is determined by random parameter $R^{t+1}$. The update function $\Phi$ can be written in terms of a range $(R_{lower}, R_{upper}]$ for which a transition occurs. A probability of mapping x to one of its neighbors using the update function is equal to the transition probability. The key property of the update function $\Phi$ is that it is deterministic in $R^{t+1}$. Given a set of initial states $X^{-T}$ and a Markov Chain $R^{-T}, R^{-T+1}, \ldots, R^{-1}, R^0$ the set of states, nodes, and paths is deterministic.

For online social networks, it is possible to estimate an update function $\Phi(X^t, R^{t+1})$ for each node $\chi \in X^t$ based on adjacent nodes. There are two common methods for calculating the update function $\Phi$ in online social networks: Random Walk and Metropolis-Hastings. For each node $x_i$ with degree $k_i$, the set of adjacent nodes is denoted as $\{x_{i,j} | j \in [0, k_i-1]\}$. In the Random Walk (RW), each adjacent node is equally likely, the probability of transitioning to a node is $$P(x_i, x_j) = \frac{1}{k_i} \qquad (6)$$

and the update function is given by $$\Phi(x_i, R^{t+1}) = x_{i,j}, \text{ if } R^{t+1} \in \left(\frac{j}{k_i}, \frac{j+1}{k_i}\right] \qquad (7)$$

Metropolis-Hasting (MH) processes modify probability $P(x_i, x_{i,j})$ to be $$P(x_i, x_{i,j}) = \min\left(\frac{1}{k_i}, \frac{1}{k_{ij}}\right) \quad (8)$$

where $k_{i,j}$ is the degree of the adjacent node $x_{i,j}$. The Metropolis-Hasting process allows for self transition with probability $$P(x_i, x_{i,j}) = 1 - \Sigma_j P(x_i, x_{i,j}) \quad (9)$$

Then the update function is given by $$\Phi(x_i, R^{t+1}) = \begin{cases} x_{i,j} \text{ if } R^{t+1} \in \left(\sum_{k=0}^{j-1} P(x_i, x_{i,k}), \sum_{k=0}^{j} P(x_i, x_{i,k})\right] \\ x_i \text{ if } R^{t+1} \in \left(\sum_j P(x_i, x_{i,j}), 1\right] \end{cases} \quad (10)$$

Figure 1:
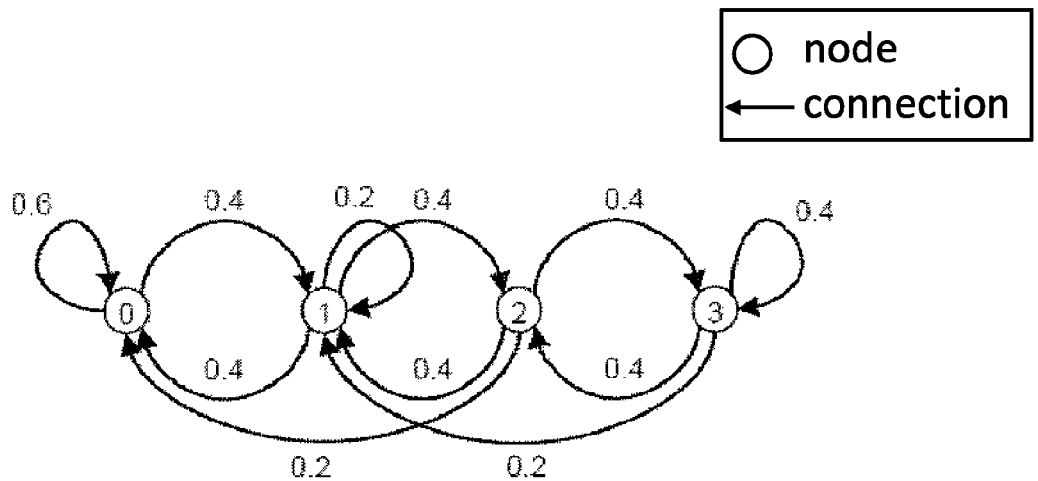
FIG. 1 is a sample graph with weighted interconnections.

Referring to FIG. 1, shown is a simplified diagram of a toy example from the literature. The toy example shows a directed graph network. Instead of estimating transition probabilities using degrees of a node and nodes adjacent thereto, the toy example typically has defined global transition probabilities of a chain. Therefore, given a current state 1, the update function based on Metropolis-Hasting process and a coupling-from-the-past process is actually estimated by using equation 10.

The update function defines a random map, and is a deterministic function, $$\Phi(R^t):\Omega \to \Omega \quad (11)$$

Some states in $\Omega$ might not be necessary to be start states of Markov chains. Typically, a small $\Omega' \subset \Omega$ is sufficient to be start states for global coupling. A small and non-trivial subset $\Omega'$ is much desired in practice instead of whole state space $\Omega$. In particular, sampling on a large online social network using coupling-from-the-past to produce a representative sample within known limits or even to produce a near perfect sample would be advantageous.

In essence, $\Phi(R^t)$ and $F_{t1}^{t2}(x)$ define a new random map as $$\Phi(R^t) \text{ or } F_{t1}^{t2}:\Omega' \text{ approaches } \Omega \quad (12)$$

This non-trivial state space $\Omega'$ can be formally defined with the following definition:

Given $\Phi(\Omega, R^t)$, denoted as $\Phi_t(\Omega)$, and the composite function
$F_{t1}^{t2}(\chi) = (\Phi_{t2-1} \cdot \Phi_{t2-2} \ldots \Phi_{t1})(\chi)$, where $t_1 < t_2$ and $\forall_\chi \in \Omega$, if the time distance $|t_1-t_2|$ is sufficiently large, s.t., $F_{t1}^{t2}(\chi) \subseteq \Omega' \subseteq \Omega$, then $\Omega'$ is called a non-trivial state space with respect to $t_2$.

A non-trivial state space $\Omega'$ is a subset of the state space $\Omega$. Simply, $\Omega$ is also a non-trivial state space by itself. One may expect that $F_{-M}^{0}(\Omega')$ coalesces to an exact sample from $\pi$ given a M. This is justified because $F_{-M}^{0}(\Omega')$ has the same distribution as $\pi$.

Consider $F_{-t}^{M-1}(\Omega) \subseteq \Omega'$ as t approaches infinity, it is equivalent to say that the backward coupling from the state space "coalesce" to a non-trivial state space instead of a single state. This allows for an algorithm design to identify a non-trivial state space.

Herein is disclosed a non-trivial state space process (NTSS) to generate a non-trivial state space. Note that the standard coupling-from-the-past theoretically produces a perfect sample by obtaining coalescence of global coupling. Instead of only a single perfect sample, the novel idea behind NTSS is to adapt the coupling-from-the-past process for search for all non-trivial states. The additional parameter is a coefficient that describes a distance between non-trivial states with a fixed time interval. The larger the distance, the less their relationship is.

A Non-Trivial State Space process is set out in the following:

Input N: the size of non-trivial state space, $X_0$: initial states $\tau$: the coefficient of non-trivial states, e.g., for a large network;

Output: a non-trivial state space

```
begin
    s = 0, Ω` = X_0
    while |Ω`| < N or |Ω`| > s
        i = 0, T = -1, T_0 = 0
        repeat
            t = T, X^t = Ω`, s=|Ω`|
            R^{T+1}, ..., R^{T_0}~U(0,1)
            while t < 0
                X^{t+1} = Φ(X^t, R^{t+1})
                t = t + 1
            T_0 = T, T = 2T
            i = i + 1
        until i ≥ τ V |X^t| = 1
        F_{t1}^{t2}(χ) ⊆ Ω` = Ω` ∪ X^t
end
```

EXAMPLE 2

Figure 2:
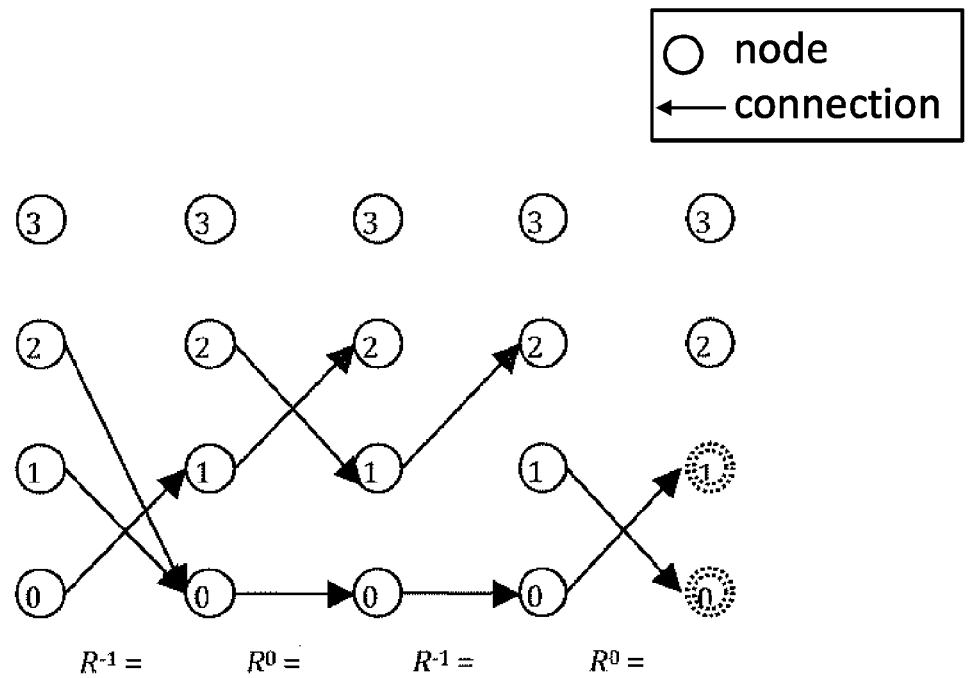
FIG. 2 is a simplified node diagram showing node traversal for identifying a trivial state space using the NTSS with the example of FIG. 1.

Given the directed graph network and the states and the transition probabilities of the Markov chain shown in FIG. 1, there are only two initial states, 0 and 1, covered by the dashed double circles. The NTSS is executed with N=4 and $\tau$=2. The NTSS produces a non-trivial state space as shown in FIG. 2.

In the first iteration of the while loop in the NTSS, the generated random vector is $\{R^{-1} (=0.7), R^0 (=0.3)\}$. When t=-1, $|\Omega'|=\{0, 1\}$; when t=-2, $|\Omega'|=\{0, 1, 2\}$.

In the second iteration of the while loop, the random vector is $\{R^{-1} (=0.1), R^0 (=0.5)\}$, generated by using a new random seed that is different from the first random seed used for generating the first random vector. Thus, when t=-1, $|\Omega'|=\{0, 1, 2\}$; when t=-2, $|\Omega'|=\{0, 1, 2\}$.

The process continues until the non-trivial state space with the specified size N=4 is obtained. This can take place as long as $R^t \in (0.6, 1]$ is drawn in later iterations of the while loop. At that case, $\Phi(2, 0.7)=3$, $R^t \in (0.6, 1]$.

According to the previous discussion, the online coupling-from-the-past is used for approximately perfect sampling of online social networks. The process first generates a non-trivial state space $\Omega'$ from given initial states $X_0$ using the proposed NTSS. Independent perfect samples are obtained by independently executing a standard coupling-from-the-past with the customized update function discussed herein and the obtained non-trivial state space $\Omega'$. Of course, other updates functions are also supported so long as they achieve coalesced approximately perfect representative samples. More details about the online coupling-from-the-past is set out as follows:

Input n: the total number of independent perfect samples, $X_0$: initial states consisting of some nodes as sample seeds from a given online social networks, e.g., Facebook, etc;

Output S: a collection of independent perfect samples

```
begin
    Ω` = NTSS(n, X₀),
    i = 0, T = 1, S = { }
    while i < n
        s = coupling-from-the-past(T, Ω` ), by φ in (7) or (10) and (14)
        i = i + 1
        S = S ∪ {s}
    end
```

As discussed above, to implement the online coupling-from-the-past process for sampling online social networks, a significant issue is to effectively design the update function for the online coupling-from-the-past. Two update functions are discussed hereinbelow.

Two common methods: RW and Metropolis-Hasting for probability transition exhibit quite different performance. The uniform method allows for a Markov chain evolving from a current state to a next new state with equal probability. The Metropolis-Hasting method heuristically estimates a probability distribution for transition of states in a Markov chain by estimating local density of nodes. Therefore, the Metropolis-Hasting process is often more powerful than a uniform method when applied to complex networks.

The update function is set by selecting either the RW or the MH methods for calculating transition probabilities; further, we show that the update function with the MH method is more robust than the update function with the RW method for sampling on complex networks. A subset of the whole state space, called non-trivial state space, can be identified by using the proposed Non-Trivial State Space algorithm, which is implemented by assuming a novel strategy to modify the standard coupling-from-the-past. Finally, a coupling-from-the-past process for sampling online social networks is described.

The proposed update function is a function of a random variable and is governed by transition probability of a node. The update function is dominated by random numbers. Therefore, the update function is also regarded as a time-related random map, and its probability is equal to a transition probability. However, it is observed that all Markov chains in the online coupling-from-the-past potentially remain at the current state at some time step t when the random number is large, e.g., $R^t \cong 1$. This is regarded as an exceptional transition for evolution of Markov chains. Avoiding this exceptional transition is beneficial for producing coalescence in the online coupling-from-the-past. To this end, a different random number $\hat{R}_i = R(x_i)$ that is associated with each state $x_i$, is produced. $\hat{R}(x_i)$ is used for updating by $$Rt = \begin{cases} R^t + \hat{R}_i, & \text{if } R^t + \hat{R}_i \leq 1 \\ |R^t + \hat{R}_i - 1|, & \text{otherwise} \end{cases} \quad (14)$$

Because $R^t$ is a uniform random number and $\hat{R}_i$ is fixed for each $x_i$, $R_i^t$ is also uniformly distributed in (0, 1]. The equation is only to translate the original $R^t$ in (0, 1]. This avoids self-transitions occurring at the same time steps in all Markov chains.

As discussed hereinabove, two different random sequences are used for defining independent update functions. One is related to time steps while the other is related to states. In general, a random number generator for each is initializable at a beginning of the online coupling-from-the-past. Thus, repeated initialization as is used in some standard coupling-from-the-past implementations is obviated. Relying on random generators at the beginning for generating random values obviates a need to keep track of many random seed values and resulting sequences of random values derived therefrom. As a result, an online coupling-from-the-past is comparable with the read-once coupling-from-the-past for generating independent "perfect" samples relying on different random seeds.

Optionally, another of other methods of selecting nodes based on random numbers is employed. Many such methods likely exist. For example, another way to select nodes based on random values is by binning nodes like so:

| Can1 | Can 2 | CurrNode | Can3 | CurrNode | Can4 |
|---|---|---|---|---|---|
| (0 ... 0.25) | (0.25 ... 0.375) | (0.375 ... 0.5) | (0.5 ... 0.5625) | (0.5625 ... 0.75) | (0.75 ... 1) |

This allows us to still select a candidate node from a shuffled array, and then see where the random number lies within the bin. A simple selection criterion is therefore (u*CurrNode) % 1<=min(1,CurrNode/CanNode)

This makes the MH selection efficient and deterministic

If a result of the coupling-from-the-past process is or approximates a perfect sampling from a given space, then it is possible to execute numerous coupling-from-the-past processes, each with different seed values, to generate a plurality of independent approximately perfect samples. Combining of the approximately perfect samples results in a larger sample that is also approximately perfect. So long as there are no resulting duplicate nodes within the larger sampling, the process—executed in parallel for example—avoids oversampling. Of course, the term perfect as used here is theoretical and in practice some level of quantization and noise is present in an output sample from the process. Results and samples are merely within limits of the perfect sample.

When duplicate nodes result from combining different results of the coupling-from-the-past process, this is accounted for with either the statistics of the system such that oversampling in the result is supported or by eliminating those output samples that contain duplicates from the combined sample. For example a coupling-from-the-past process is executed on the Twitter® network to extract a representative sample of 100 nodes. A sample of 1000 nodes is sought, so the process is executed 10 times with 10 different seed values. The 1000 resulting nodes are amalgamated into the final output sample. Other than oversampling—a single node being within the output sample more than one time—the result is representative of the Twitter® network. Alternatively, the coupling-from-the-past process is executed 20 times and those resulting samples that have no overlapping nodes are selected such that 1000 unique nodes are present within the 1000 node output result.

Further, the error present in the output sample relative to a perfect sample is quantifiable statistically at the outset. As any sample will result in some potential error—statistically a definition of sampling would give a level of accuracy and a likelihood of accuracy such as 99% 19 out of 20 times—and the acceptable error is determinative of the minimum sample size for each coupling-from-the-past process—here 100 nodes—and the overall criteria for sample generation. That said, because of its deterministic nature, the couplingfrom-the-past process is very well suited to generating samples within statistical limits as pre-defined.

Though the term perfect is used herein, it is not intended to refer to a theoretically perfect sample, but to a sample meeting statistical requirements within predetermined statistical limits.

Numerous other embodiments may be envisaged without departing from the spirit or scope of the invention.

What is claimed is:

1. A method comprising:
providing an online social network, the online social network comprising at least a data store for storing data relating to a plurality of connections forming a state space and a communication port for supporting communication with individuals to whom the connections relate, the individuals communicating with the online social network via a wide area communication network;
providing a first seed value;
providing a coupling-from-the-past (CFTP) process having an update function for resulting in a non-trivial state space smaller than the state space of the online social network and forming a representative sample thereof;
based on the first seed value selecting at least a first node;
retrieving from the online social network dataset via the wide area communication network data based on the selected at least a first node; and
applying the coupling-from-the-past process having the update function to the at least a first node to determine a non-trivial state space based on the first seed value, the non-trivial state space smaller than the state space of the online social network and the non-trivial state space forming an intermediate state in determining a representative sample of the online social network, and
using the non-trivial state space to form a first representative sample.

2. The method according to claim 1 wherein the coupling-from-the-past process comprises: verifying that the process has coalesced to a single state and providing the single state as the first representative sample.

3. The method according to claim 1 wherein the coupling-from-the-past process comprises: verifying that the process has other than coalesced to a single state from a first time in the past, and iterating the coupling-from-the-past process again from a second time further in the past.

4. The method according to claim 3 wherein the second time further in the past is achieved by incrementing a negative offset to the first time by 1.

5. The method according to claim 1 comprising
providing a second seed value other than the first seed value;
based on the second seed value selecting at least a second node;
retrieving from the online social network dataset via the wide area communication network data based on the selected at least a second node; and
applying the coupling-from-the-past process having the update function to the at least a second node to determine a second non-trivial state space based on the second seed value, the second non-trivial state space smaller than the state space of the online social network and the non-trivial state space forming an intermediate state in determining a representative sample of the online social network, and using the non-trivial state space to form a second representative sample.

6. The method according to claim 5 comprising: combining the first representative sample and the second representative sample.

7. The method according to claim 6 wherein the combined first representative sample and the second representative sample includes some nodes more than once.

8. The method according to claim 6 wherein the combined first representative sample and the second representative sample includes a number of nodes equal to the number of nodes in each space combined and includes only unique nodes.

9. The method according to claim 1 further comprising: using the first representative sample, surveying data within the online social network, a result of surveying statistically relevant to the online social network on which the surveying is performed.

10. The method according to claim 9 comprising: updating the first representative sample at intervals.

11. The method according to claim 10 wherein the intervals are less than or equal to a day.

12. The method according to claim 1 wherein the update function is selected for preventing repeated self-transitions.

13. The method according to claim 1 wherein the update function is selected for avoiding self-transitions.

14. The method according to claim 13 wherein the update function is $$Rt = \begin{cases} R^t + \hat{R}_i, & \text{if } R^t + \hat{R}_i \leq 1 \\ \lfloor R^t + \hat{R}_i - 1 \rfloor, & \text{otherwise} \end{cases}$$

$R^t$ is a uniform random number, $\hat{R}_i$ is a random number associated with state $x_t$, t is a time step, and i is an index of the states.

15. The method according to claim 14 wherein random values associated with nodes are generated at a beginning of the CFTP process.

16. A method of sampling an online social network dataset comprising:
providing a first seed value;
providing a coupling-from-the-past process having an update function for resulting in a non-trivial state space smaller than the state space of the online social network and forming a representative sample thereof;
based on the first seed value selecting at least a first node;
retrieving from the online social network dataset via a computer communication network data based on the selected at least a first node; and
applying the coupling-from-the-past function having the update function to the at least a first node to determine a first non-trivial state space based on the first seed value, the first non-trivial state space smaller than the state space of the online social network and the first non-trivial state space forming an intermediate state in determining a representative sample of the online social network.

17. The method according to claim 16 comprising: using the first non-trivial state space and the coupling-from-the-past process to form a first representative sample, the first representative sample representative of the online social network.

18. The method according to claim 16 wherein the first non-trivial state space comprises a predetermined number of nodes.

19. The method according to claim 16 comprising:
providing a second seed value;
based on the second seed value selecting at least a second node;
retrieving from the online social network dataset via a computer communication network data based on the selected at least a second node; and
applying the coupling-from-the-past function having the update function to the at least a second node to determine a second non-trivial state space based on the second seed value, the second non-trivial state space smaller than the state space of the online social network and the second non-trivial state space forming an intermediate state in determining a representative sample of the online social network.

20. The method according to claim 19 comprising:
using the first non-trivial state space and the coupling-from-the-past process to form a first representative sample, the first representative sample representative of the online social network; and
using the second non-trivial state space and the coupling-from-the-past process to form a second representative sample, the second representative sample representative of the online social network.

21. The method according to claim 20 comprising adding the first representative sample and the second representative sample to form a larger representative sample.

22. The method according to claim 19 wherein using the first non-trivial state space and using the second non-trivial state space is performed in parallel.

23. The method according to claim 19 wherein applying the coupling-from-the-past function is performed for the at least a first node in parallel to applying the coupling-from-the-past function being performed for the at least a second node.

* * * * *

UNITED STATES PATENT AND TRADEMARK OFFICE
CERTIFICATE OF CORRECTION

PATENT NO.        : 9,661,084 B2
APPLICATION NO.   : 14/039086
DATED             : May 23, 2017
INVENTOR(S)       : John Kenton White and Guichong Li Page 1 of 1

It is certified that error appears in the above-identified patent and that said Letters Patent is hereby corrected as shown below:

On the Title Page

Item (73), should read:
Assignee: Advanced Symbolics (2015) Inc., Ottawa (CA)

Signed and Sealed this
Ninth Day of October, 2018

Andrei Iancu
*Director of the United States Patent and Trademark Office*